Patented Aug. 3, 1937

2,088,598

UNITED STATES PATENT OFFICE 2,088,598

MANUFACTURE OF ALKYLATED CYCLIC HYDROCARBONS

Vladimir Ipatieff and Aristid V. Grosse, Chicago, Ill., assignors to Universal Oil Products Company, Chicago, Ill., a corporation of Delaware No Drawing. Application March 7, 1935, Serial No. 9,829

8 Claims. (Cl. 260—168)

This invention relates particularly to the manufacture of alkylated derivatives of cyclic hydrocarbons of the aromatic and naphthene series.

More specifically the invention comprises a process for manufacturing these derivatives, which may be looked upon in one sense as homologs of the base compounds benzene and hexahydrobenzene by the use of saturated chain hydrocarbons and catalysts, particularly suitable for accelerating the reactions.

The present process is a contribution to the art of producing higher molecular weight hydrocarbons by causing condensation reactions between those of different groups. Reactions are known between olefin hydrocarbons and aromatic hydrocarbons in the presence of suitable catalysts to produce alkylated derivatives and similar condensations have been effected between olefins and naphthene hydrocarbons. The catalysts usually found preferable in these reactions are the mineral acids, sulfuric and phosphoric acids and metal salts such as for example, zinc and aluminum chlorides, etc. In this type of reaction at least one of the reacting constituents, to wit, the olefin, is characterized by a double bond and the primary reaction when using for example, an acid catalyst, may be assumed to be the formation of an intermediate ester which then reacts with the ring compound to substitute an alkyl group for a ring hydrogen atom and regenerate the acid for further catalysis. This type of reaction is never 100% efficient as a number of side reactions invariably occur such as, for example, the formation of olefin polymers as well as alkylated ring compounds. In the case of acid such as sulfuric acid and particularly when employing high molecular weight hydrocarbons, a certain amount of oxidation also takes place which destroys some of the acid and a corresponding amount of hydrocarbon. While the composition of the intermediate reaction products is more difficult of determination when using heavy metal halides to accelerate these reactions, their presence is more or less definitely indicated by the formation of heavy sludges from which both hydrocarbons and heavy metal salt residues are obtainable either by hydrolysis or heating.

In one specific embodiment the present invention comprises the manufacture of alkyl derivatives of ring hydrocarbon including aromatics and naphthenes by interacting paraffin hydrocarbons therewith in the presence of catalysts comprising essentially aluminum chloride and hydrogen chloride.

The present type of reaction is distinct from previously employed alkylation reactions in that saturated or paraffin hydrocarbons are employed as the source of the alkyl groups so that the overall process involving the primary formation of alkyl radicals from the saturated paraffins and their later addition to the ring compounds may be designated as "destructive alkylation". It has been observed that, if paraffin hydrocarbons are heated alone in the presence of aluminum chloride, only a very limited amount of decomposition occurs while, if ring hydrocarbons are present to act as what might be termed "acceptors", extensive decomposition of the paraffins is evident from the formation of large quantities of alkylated ring compounds. The type of reaction with which the present process is concerned therefore involves a group of hydrocarbons which is capable of yielding alkyl residues on dehydrogenation, a group which is capable of being readily alkylated by said groups, and a particular catalyst capable of accelerating the reactions to a definite and practical degree.

The invention may comprise the use of any paraffin hydrocarbon to alkylate any aromatic (either mono or polynuclear) and correspondingly any naphthene hydrocarbon, considering the naphthenes to include both hydrogenated aromatics containing 6 carbon atoms in the rings or other cyclic compounds containing 3, 4, 5 and 7 methylene groups.

In the practice of the invention different modes of procedure may be followed to effect the desired reactions. When some of the reacting constituents are liquid and others are gaseous or vaporous at the preferred temperatures of treatment, the reactions of destructive alkylation may be brought about by introducing the gaseous components into a suspension of anhydrous aluminum chloride in the liquid reactant. This condition is illustrated by the case of benzol and i-butane. A suspension of aluminum chloride is maintained in benzol by the ebullition of the latter under a reflux condenser, and i-butane is introduced into the suspension at some optimum rate depending upon the extent of the reaction desired. In case both reactants are liquid as, for example, octane and cyclohexane, the aluminum chloride may be maintained in suspension by mechanical means or heating convection currents in either of the hydrocarbons while the other is introduced as a liquid or a vapor, or the two liquids may be mixed in suitable proportions and heated gradually in the presence of the catalyst. With some combinations of compounds the last-named method of procedure may involve some risk dependent upon the control of the reaction at a critical temperature which may take place with too great speed unless the reaction mixture is cooled.

In all cases it is essential that a definite although small amount of hydrogen chloride be present to assist in catalyzing the desired reactions. This may be introduced in any convenient manner such as, for example, in admixture with the gases or vapors which are introduced under the surface of hydrocarbon liquid in which aluminum chloride is suspended according to one of the above mentioned modes of procedure or introduced separately as a substantially dry gas when the reacting hydrocarbons are both liquid.

Owing to the widely varying boiling ranges and somewhat variable properties of the homologs of the three groups involved in the present type of reaction, it is evident that the temperature and pressure conditions and the amount of catalyst necessary for promoting the desired reactions cannot be stated to lie within definite ranges. For each combination of paraffin and ring hydrocarbon there will exist an optimum set of conditions in respect to these factors for a given degree and type of alkylation which is best determined on a small scale before transferring the process to large scale commercial plants.

The present process may be utilized in building up a large number of individual chemical compounds corresponding to aromatic and naphthene homologs or in producing mixtures of such which are utilizable for various purposes. Extensive experimentation has shown that the alkyl derivatives of aromatic and naphthene hydrocarbons up to certain limit boiling points and molecular weights are better antiknock materials when used as motor fuel than the simpler base compounds. Therefore, the process enables the production of hydrocarbon blending fluids of superior antiknock value from simpler hydrocarbon molecules while utilizing relatively low molecular weight paraffin hydrocarbons as the alkylating agents. The reactions whereby such aromatics and naphthenes are alkylated by olefins in the presence of suitable catalysts are fairly well established and the present process supplements older art in enabling the utilization of paraffin hydrocarbons in place of olefin hydrocarbons, such as would be present in such gas mixtures as those produced in oil cracking operations after the removal of the olefinic constituents by polymerization, condensation, alkylation or other reactions of which they are capable.

Considering the higher molecular weight compounds boiling above the range of motor fuels, the present process may be employed to build up molecules which are similar to those present in lubricating oil fractions produced by distillation of selected crude petroleums. The compounds naturally present in these cuts have been fairly well identified as mono or polycyclic hydrocarbons containing long chain substituent groups.

The following examples are given as representative of results obtainable by the use of the process although they are not to be taken as imposing corresponding limitations upon the scope of the invention.

Example I

This example involves the alkylation of benzene with isooctane. Approximately equimolecular proportions of these two hydrocarbons were stirred together at slightly elevated temperatures (25–50° C.) in the presence of 3% by weight of powdered anhydrous aluminum chloride while introducing a small amount of dry hydrogen chloride. After three or four hours' contact at atmospheric pressure, it was found by analysis of the hydrocarbon products that the isooctane was substantially all decomposed, being split partially into isobutane and a radical which alkylated the benzene to form terbutyl benzene of the formula $C_6H_5.C_4H_9$. The blending octane number of the liquid reaction product when used in inferior antiknock gasolines was about double that of the original benzene.

Example II

This example represents a type reaction between a paraffin and a naphthene. A mixture of equal parts by weight of hexane and cyclohexane was heated under pressure at a temperature of 175° C. for 20 hours in the presence of 10% by weight of powdered anhydrous aluminum chloride and 1% by weight of dry hydrogen chloride. Distillation of the liquid products showed that they represented 60% by weight of the original reactants and boiled between the approximate range of 90–200° C. which corresponds to the heavier end of ordinary motor fuel. The blending octane number of this fraction was found to be about 110 by test in admixture with an inferior grade of paraffinic gasoline.

The character and utility of the present invention is obvious from the preceding specification and limited numerical data introduced though the broad scope of the invention is not to be exactly limited either to the descriptive material or the numerical data.

We claim as our invention:

1. A process for the production of alkyl derivatives of cyclic hydrocarbons which comprises, reacting said cyclic hydrocarbons with a paraffin hydrocarbon in the substantial absence of added olefins and in the presence of aluminum chloride and hydrogen chloride to alkylate the cyclic hydrocarbon.

2. A process for the production of alkyl derivatives of mono-nuclear aromatic hydrocarbons which comprises, reacting the aromatic hydrocarbon with a paraffin hydrocarbon in the substantial absence of added olefins and in the presence of aluminum chloride and hydrogen chloride to alkylate the aromatic hydrocarbon.

3. A process for the production of alkyl derivatives of aromatic hydrocarbons which comprises, reacting the aromatic hydrocarbon with a paraffin hydrocarbon in the substantial absence of added olefins and in the presence of aluminum chloride and hydrogen chloride to alkylate the aromatic hydrocarbon.

4. A process for the production of alkyl derivatives of naphthenic hydrocarbons which comprises, reacting the naphthenic hydrocarbon with a paraffin hydrocarbon in the substantial absence of added olefins and in the presence of aluminum chloride and hydrogen chloride to alkylate the naphthenic hydrocarbon.

5. A process for the production of alkyl derivatives of aromatic hydrocarbons which comprises, reacting the aromatic hydrocarbon with a gaseous paraffin hydrocarbon in the substantial absence of added olefins and in the presence of aluminum chloride and hydrogen chloride to alkylate the aromatic hydrocarbon.

6. A process for the production of alkyl derivatives of naphthenic hydrocarbons which comprises, reacting the naphthenic hydrocarbon with a gaseous paraffin hydrocarbon in the substantial absence of added olefins and in the presence of aluminum chloride and hydrogen chloride to alkylate the naphthenic hydrocarbon.

7. A process for the production of alkyl derivatives of aromatic hydrocarbons which comprises, reacting the aromatic hydrocarbon with a gaseous paraffin hydrocarbon in the substantial absence of added olefins and in the presence of aluminum chloride and hydrogen chloride and at a temperature exceeding 25° C. to alkylate the aromatic hydrocarbon.

8. A process for the production of alkyl derivatives of naphthenic hydrocarbons which comprises, reacting the naphthenic hydrocarbon with a gaseous paraffin hydrocarbon in the substantial absence of added olefins and in the presence of aluminum chloride and hydrogen chloride and at a temperature exceeding 25° C. to alkylate the naphthenic hydrocarbon.

VLADIMIR IPATIEFF.
ARISTID V. GROSSE.